May 14, 1940.   H. E. HEIGIS   2,200,922
FUEL TANK DUMP VALVE
Original Filed April 15, 1936    2 Sheets-Sheet 1

INVENTOR,
Henry Ernest Heigis,
BY
J. William Carson
ATTORNEY

May 14, 1940.　　　　　H. E. HEIGIS　　　　　2,200,922
FUEL TANK DUMP VALVE
Original Filed April 15, 1936　　2 Sheets-Sheet 2

INVENTOR,
Henry Ernest Heigis,
BY
J. William Carson
ATTORNEY

Patented May 14, 1940

2,200,922

UNITED STATES PATENT OFFICE 2,200,922

FUEL TANK DUMP VALVE

Henry Ernest Heigis, West Orange, N. J., assignor to Specialties Development Corporation, Bloomfield, N. J., a corporation of New Jersey Original application April 15, 1936, Serial No. 74,452. Divided and this application April 29, 1937, Serial No. 139,710

15 Claims. (Cl. 137—21)

The present invention is a division of applicant's co-pending application, Serial No. 74,452, filed April 15, 1936, for "Fuel tank evacuating apparatus," and embodies that portion of the apparatus illustrated and described in the above co-pending application which relates to the fuel tank dump valve. It will be apparent that a fuel tank dump valve may have wide application, and the object of the present invention, therefore, is to provide a dump valve which may be employed in a variety of ways.

Various methods have been proposed to convert the fuel tanks of an airplane into flotation means for the airplane when the airplane has chanced to alight on a body of water so that the plane and the pilot may be saved. The advantage of using the fuel tanks in this capacity is that very little extra equipment is required in comparison with the equipment which is necessary when the airplane is provided with a separate flotation means.

It has often been proposed to use a non-inflammable high pressure gas, such as carbon dioxide, to force the fuel from the storage tank, and several systems for accomplishing this purpose have been devised. These systems have not always been practical because they involved the use of cumbersome appliances and were not applicable to all airplanes since they used apparatus which is not usually asociated with the fuel tank.

A great many modern airplane storage tanks are equipped with a dump valve to permit the draining of the fuel from the tank, and a vent line to allow the entrance of air into the fuel reservoir as the fuel is drawn out and used in the motor. The fuel is thus permitted to flow freely. Furthermore, the vent line prevents collapse of the tank upon changes of altitude of the airplane, of which the tank is a part, with the attendant changes in the atmospheric pressure.

It is often desirable to employ a gas, such as carbon dioxide, to force the fuel from the storage tank of an airplane in order to convert the tank into a flotation member. The fuel, obviously, must be discharged through a tank dump valve, and means of positively opening this valve must be provided. Preferably, with a valve of the present type, the means employed should be the gas used to evacuate the fuel from the tank or some means operated by the pressure of that gas.

It is accordingly an object of the invention to provide a fuel tank dump valve.

A further object is to provide a fluid tank dump valve which positively opens.

An additional object is to provide a fuel tank dump valve which may be opened by the pressure of a fluid medium.

Another object is to provide a fuel tank dump valve which cannot be closed until all of the fuel has been evacuated from the tank.

These and further objects of the invention will be apparent as the invention is described in connection with the drawings, wherein.

Figure 1:
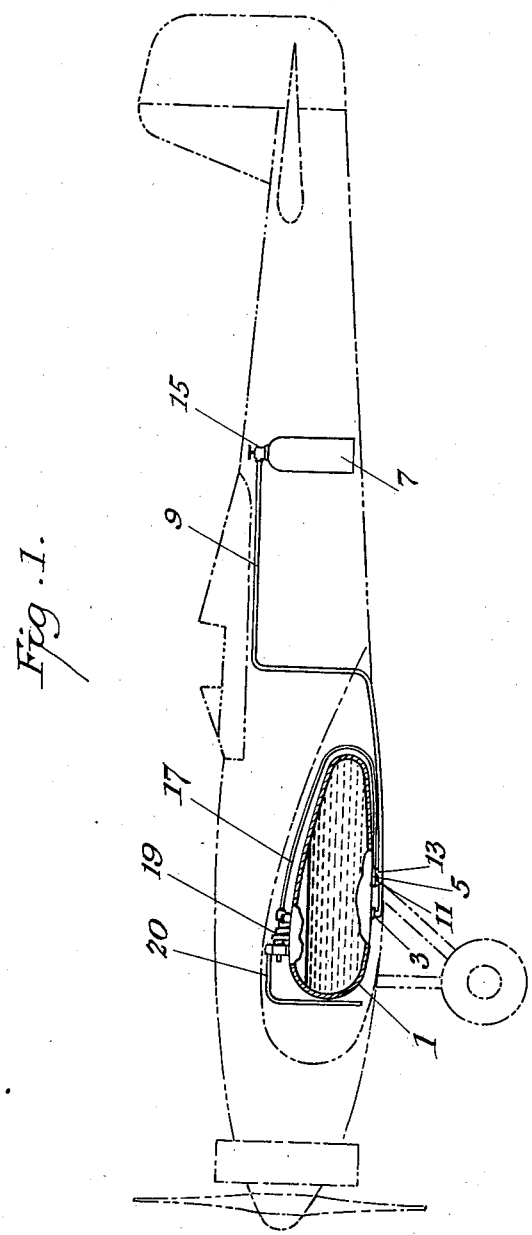
Figure 1 is a view in section of a fuel storage tank, provided with a plan view of the tank evacuating equipment constructed in accordance with the present invention and applied to an airplane which is indicated in dot and dash lines.

Referring to Figure 1, a fuel storage tank as used on an airplane is shown at 1. At the bottom of the tank is a dump valve apparatus 3 having attached thereto an operating mechanism 5 which will operate the valve when a gas under pressure is supplied thereto. The details of the dump valve and the mechanism 5 will be fully described hereinafter.

A source of gas under pressure 7, such as carbon dioxide, is connected to the mechanism 5 by a conduit 9. This conduit has two branches 11 and 13 that connect separately to the operating mechanism 5. The source of carbon dioxide 7 is provided with a valve 15 to control the discharge of the gas therefrom and is of the ordinary type and will not be described in detail since it forms no part of the present invention.

Another conduit 17 connects the operating mechanism 5 to the vent control and discharge valve 19. A vent line 20 connects the vent valve 19 to the atmosphere under normal conditions. The construction and operation of this valve is fully described in my co-pending application, Serial No. 74,452, above referred to.

Figure 2:
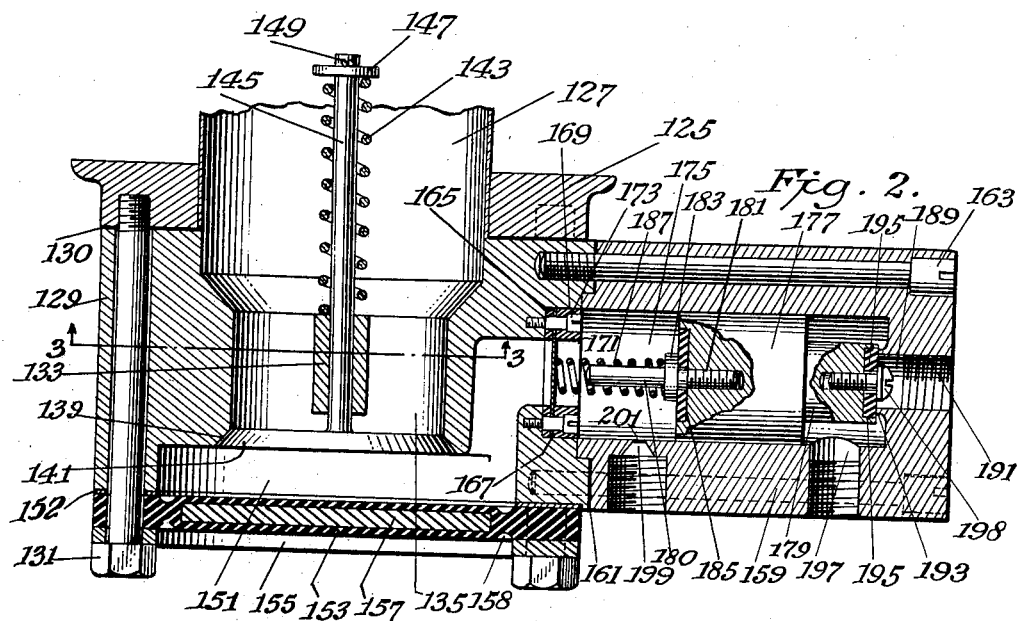
Figure 2 is a view in section of the dump valve apparatus constructed in accordance with the present invention.
Figure 3:
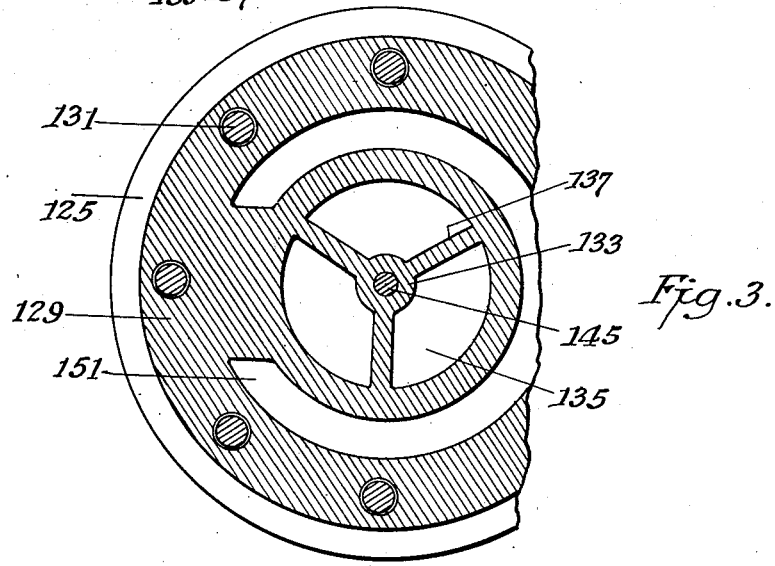
Figure 3 is a view in section taken on line 3—3 of Figure 2 and looking in the direction of the arrows.

The details and arrangement of the dump valve 3 may best be understood by reference to Figures 2 and 3.

The bottom of the tank 1 is provided with a flange 125 welded to the tank and surrounding the opening 127. A valve casing 129 bearing on a gasket 130 between the casing and the flange is fastened to this flange by the studs 131. A bushing member 133 is supported in the center of the chamber 135 of the valve casing by the ribs or webs 137 which are best seen in Figure 3.

At the end of the chamber is a valve seat 139 on which a valve disc 141 bears, being held there by the spring 143 which surrounds the stem 145 that carries the valve disc 141. One end of the spring is compressed against the bushing 133 and by the action of the washer 147 which is prevented from sliding off the valve stem by the pin 149.

Below the seat 139 is a passage 151 which opens to the exterior of the valve casing. At the bottom of the casing bearing on a gasket 152 is a disc member 153 of some moldable substance which will fracture under pressure and is impervious to the fuel which is stored in the tank. The disc member consists of a metal plate 157 about which the disc member is molded. Surrounding the metal plate are annular depressions 158 in the disc member. These depressions are provided in order to furnish a smaller cross-sectional area than the remainder of the member 153 and accordingly will be the weakest portion of the disc member and will be the point at which the member will burst most readily. The purpose of the metal plate 157 is to reinforce the center of the disc member so that it will not rupture at the center when pressure is applied to the member but will shear off at the depression sections at 158. A metal gasket 155 is adjacent the disc holder and both are secured to the casing by the studs 131.

At one side of the valve casing 129 is a piston valve chamber 159. A gasket 161 is inserted between the chamber 159 and the casing 129 when they contact each other and the whole is securely fastened together by the studs 163. Across the opening of the passage 151 is placed a washer 165 and a frangible disc 167. The washer is made of some material such as "Duprene." The washer 165 and the disc 167 are held on the valve casing 129 by a bushing 169 secured to the casing by the screws 173. Surrounding the opening in the bushing 167 is a valve seat 171.

In the passage 175 of the casing 159 is a piston consisting of an enlarged portion 177 which just fits in the passage and a smaller portion 179. A stud 180 is secured to the enlarged portion 177 by threads 181 and has near its center a head 183. The head holds a piston valve 185 of resilient material in a recess which is provided on the enlarged piston. Surrounding the stud 180 is a spring 187 held under slight compression between the disc 167 and the piston valve 185.

A vent opening 189 and a surrounding seat 193 in the passage 175 are provided at the end of the chamber which is opposite to the seat 171 and are centrally aligned therewith.

The vent opening has threads 191 to which the valve conduit 17 may be secured in order to connect the dump valve with the vent valve. The small portion 179 of the piston carries a resilient valve disc 195 secured thereto by a screw and washer 198. This valve disc coacts with the valve seat 193.

Opening into the passage 175 through a side wall of the chamber are a passage 197 and a passage 199. The opening 197 is relatively close to the end of the chamber in which the vent valve line opening 189 is located, and the other opening 199 is relatively close to the valve seat 171. These openings are threaded to receive conduits connecting the chamber to the source of carbon dioxide supply. The opening 199 is provided with a nozzle 201 through which the carbon dioxide passes in entering the chamber in order that it may be metered.

The dump valve is shown in its unoperated position. In this position the fuel confined in the tank may leak into the passage 151 but it cannot get into the passage 175 because the frangible disc 167 will prevent all leakage therethrough. However, when it is desired to discharge the fuel from the tank, the valve 15 on the source of carbon dioxide supply 7 is opened to permit the gas to flow through the conduit 9 to the piston valve chamber 159. The gas enters the passage 175 at a high pressure through the opening 197 and acts on the piston 177 but it cannot move the piston because at the same time gas has been entering the passage through the nozzle 201. The area of the face of the piston subject to the pressure of the gas entering through the nozzle 201 is much greater than the area of the piston which is subject to the pressure of the gas entering the opening 197 and hence the gas entering through the latter opening cannot move the piston.

When enough gas has entered the passage through the nozzle 201, the pressure will be high enough to burst the frangible disc 167 and thus the gas pressure may be introduced into the passage 151. The pressure will then be transmitted to the frangible disc 153 which will shear in turn, providing a relief for the gas pressure introduced by the nozzle 201. It is obvious that it does not matter whether there is fuel in the passage 151 or not since in any event the pressure of the gas will be transmitted to the disc 153.

As soon as the disc 153 has been broken, the gas pressure in the portion of the chamber supplied by the nozzle 201 will fall to a point where the gas pressure on the other side of the piston will be sufficient to move the piston over so that the piston 185 will seat on the seat 171 and the nozzle 201 will be closed off. At the same time the vent opening 189 will be opened to permit the gas to pass to the vent valve. With this arrangement it is impossible for any gas to enter the tank through the vent valve until the dump valve is free to discharge the fuel through the opening in the disc 153. With a construction like this it is impossible to rupture the tank by supplying gas pressure to a tank from which no fuel can escape.

The operation of the entire arrangement is very simple. The gas valve 15 is opened and the gas escapes from the container 7 through the conduit 9 to the dump valve operating device. After the gas has ruptured the dump valve disc, the gas passes through the conduit 17 to the vent valve 19 where the vent opening is closed and gas is introduced into the tank. The pressure of the gas forces the fuel against the valve disc 141 forcing it from its seat and expels the fluid through the opening in the disc 153.

After all of the fuel has been discharged from the tank and enough of the gas pressure in the tank has been dissipated, the valve disc 141 will be returned to its seat by the spring 143. The combined action of the spring and the external media acting on the valve disc will hold the disc on the seat and thus prevent further escape of any gas remaining in the tank. In this manner the buoyant effect of the gas can be utilized in the tank and allow the emptied tank to be used as a flotation member.

It will, of course, be apparent that the main function of the valve 141 is to close the tank against the entry of external media (specifically, water from the body of water on which the areoplane has descended) after the fuel has discharged from the tank, it being also a function of the valve to isolate the space adjacent the closure disc 153 from the tank when the fluid medium is admitted to the space to rupture the disc, to thereby confine the fluid medium to render it effective to rupture the disc; and since it is important to discharge substantially all of the fuel from the tanks, the spring 143 should be relatively light, so as not to appreciably impede the discharge of the fuel. In fact, in the actual application of the invention, the spring 143 is so light that vibration of the aeroplane with consequent vibration of valve 141 will cause fuel from the fuel tanks to leak into the passage 151 adjacent the closure disc 153, which latter alone is relied upon to normally seal the discharge opening of the tanks against the discharge of the fuel, it being actually necessary for the spring 143 to be only strong enough to lift the valve 141 to its seating position after the tank has been emptied. Such leakage of the fuel into the passage 151 is, of course, harmless, since in any event the pressure of the operating fluid medium will be transmitted to the disc 153 through the liquid, as previously referred to in the description of this invention.

It will, of course, be also appreciated that the actual pressure at which the valve 141 will open is dependent upon the strength of the spring 143, the fullness of the tank and the corresponding head of the liquid in the tank, and the pressure of the gaseous fluid introduced into the tank. The latter pressure, naturally, should be relatively low, in order to prevent rupture of the tank, and as already indicated hereinabove, the gaseous fluid is preferably admitted into the tank in a restricted stream, so as to limit the development of pressure; and it accordingly follows that the spring 143 should not be too heavy to defeat this purpose.

Accordingly, it will be seen that a novel valve for discharging fuel from a fuel tank in an airplane, in order that the tank may be used as a flotation member, has been provided.

From the foregoing disclosure, it will be apparent that this invention resides in a method embodying certain principles of construction which may be employed in other physical forms of apparatus without departure from the method shown. It is apparent that the form of the apparatus illustrated in the drawings for the purpose of disclosure has been given solely in the illustrative sense and not in any limiting sense. The scope of this invention is best defined by the appended claims.

I claim:

1. In a discharge system, a storage tank for containing a liquid, a source of fluid under pressure, means to prevent discharge of the liquid, means to permit the fluid under pressure to act on the last named means to render the same ineffective, means to prevent escape of the fluid under pressure through the ineffective discharge preventing means, means to permit controlled escape of the fluid under pressure to the tank after operation of the discharge preventing means, and means normally permitting discharge of liquid from the tank when said liquid is above a given pressure and adapted to prevent escape of any medium in the tank below said given pressure.

2. A fluid pressure actuated discharge device for a liquid storage tank comprising fluid pressure rupturable means normally preventing discharge of liquid, means to supply a fluid under pressure to rupture said first mentioned means, means to prevent escape of the fluid under pressure through said pressure rupturable means after rupture thereof, and means to divert the flow of the fluid under pressure in a desired direction after said rupture.

3. Fluid pressure actuated discharge means for a liquid storage tank comprising an outlet for the tank, means to close said outlet against the discharge of liquid comprising pressure rupturable means, means to supply a fluid under pressure to rupture said pressure rupturable means to permit discharge of the liquid, means to prevent the escape of the fluid under pressure through the outlet after rupture of the pressure rupturable means, and means to introduce the fluid under pressure into said tank after rupture of the pressure rupturable means to expel the liquid from the tank.

4. Fluid pressure actuated discharge means for a liquid storage tank comprising an outlet for the tank, means to close said outlet against the discharge of liquid comprising pressure rupturable means, means to supply a fluid under pressure to rupture said pressure rupturable means to permit discharge of the liquid, and automatically operable means to close the outlet after a sufficient decrease of pressure in the tank.

5. Fluid pressure actuated discharge means for a liquid storage tank comprising an outlet for the tank, means to close said outlet against the discharge of liquid comprising pressure rupturable means, a chamber adapted to be placed into communication with a space in the tank adjacent the pressure rupturable means, frangible means normally separating said space and said chamber, means to supply a fluid under pressure to said chamber to effect rupture of first said frangible means and then said pressure rupturable means to permit discharge of the liquid, means in said chamber adapted to effect introduction of the fluid under pressure into said tank after rupture of both the frangible means and the pressure rupturable means to thereby expel the liquid from the tank, and means in said chamber to prevent the escape of the fluid under pressure through the frangible means and the pressure rupturable means after rupture.

6. Fluid pressure actuated discharge means for a liquid storage tank comprising an outlet for the tank, means to close said outlet against the discharge of liquid comprising pressure rupturable means, a chamber adapted to be placed into communication with a space in the tank adjacent the pressure rupturable means, frangible means normally separating said space and said chamber, means to supply a fluid under pressure to said chamber to effect rupture of first said frangible means and then said pressure rupturable means to permit discharge of the liquid, and means in said chamber adapted to effect introduction of the fluid under pressure into said tank after rupture of both the frangible means and the pressure rupturable means to thereby expel the liquid from the tank, said last recited means being adapted to prevent the escape of the fluid under pressure through the frangible means and the pressure rupturable means after rupture.

7. Fluid pressure actuated discharge means for a liquid storage tank comprising an outlet for the tank, means to close said outlet against the discharge of liquid comprising pressure rupturable means, a chamber adapted to be placed into communication with a space in the tank adjacent the pressure rupturable means, frangible means normally separating said space and said chamber, a pair of ports in the wall of said chamber, one of which is adapted to communicate with the tank and the other of which is adapted to communicate with the space adjacent the pressure rupturable means when the frangible means are ruptured, pressure operable means in said chamber adapted to open and close said ports, means to apply a balanced fluid pressure to said pressure operable means, said pressure being adapted to effect rupture of both the frangible means and the pressure rupturable means, and the pressure operable means being adapted upon the unbalance of the pressure following the rupture of both the frangible means and the pressure rupturable means to close the port adapted to communicate with the space adjacent the pressure rupturable means to prevent the escape of the fluid under pressure therethrough and to open the port adapted to communicate with the tank to effect introduction of the fluid under pressure in said tank to thereby expel the liquid therefrom.

8. Fluid pressure actuated discharge means for a liquid storage tank comprising an outlet for the tank, means to close said outlet against the discharge of liquid comprising pressure rupturable means, a valve member adapted to seat in said outlet to isolate a space adjacent the pressure rupturable means from said tank, and means to introduce a fluid under pressure into said space to effect rupture of said pressure rupturable means, said valve member being adapted to be unseated to permit discharge of the liquid from the tank after rupturing of the pressure rupturable means.

9. Fluid pressure actuated discharge means for a liquid storage tank comprising an outlet for the tank, means to close said outlet against the discharge of liquid comprising pressure rupturable means, means to supply a fluid under pressure to rupture said pressure rupturable means to permit discharge of the liquid, and means to prevent the escape of the fluid under pressure through the pressure rupturable means after rupture.

10. Fluid pressure actuated discharge means for a liquid storage tank having a discharge opening, spaced primary and secondary closure means for the opening of which the primary closure means are outermost with respect to the tank, means to introduce a fluid under pressure into the space between the primary and secondary closure means to effect opening of the primary closure means, said secondary closure means being adapted to close the outlet against the flow of any medium from said space to the tank and to permit discharge of the liquid from the tank after opening of the primary closure means, and means to prevent the escape of the fluid under pressure through the primary closure means after the opening thereof and to direct the fluid under pressure into said tank to expel the liquid from the tank.

11. In a stored liquid dumping system, a liquid storage container having a weakened portion in the wall thereof, valve means in the container adjacent to said weakened portion of the container wall and forming a chamber with that wall portion, a source of fluid medium under pressure, means defining a fluid medium conducting path between said source and the container, means defining a fluid medium conducting path between the source and said chamber, and means controlling the flow of fluid medium through both of said conducting means, said controlling means being adapted to first direct the fluid medium to said chamber to rupture said weakened portion of the container wall and then to direct the fluid medium to the container to expel the liquid therefrom, and said valve means being adapted to close the container against the flow of any medium from said chamber to the container and to permit discharge of the liquid after rupture of the weakened portion of the container wall.

12. In a stored liquid dumping system, a liquid storage container having an opening, a pressure removable member adapted to close said container opening from the outside, a pressure operable valve within the container placed so as to control the outflow of any liquid through said opening and forming a chamber with said pressure removable member, a source of a fluid medium under pressure, fluid medium conducting means between the source of fluid medium and the container, fluid medium conducting means between the source and said chamber, pressure operable means normally obstructing the path of the fluid medium through the first named conducting means and adapted to be rendered inoperative, and pressure operable means adapted upon the first named flow obstructing means being rendered inoperative to obstruct the path of the fluid medium through the second named conducting means.

13. In a stored liquid dumping system, a liquid storage container having an opening, a pressure removable member adapted to close said container from the outside, a pressure operable valve structure within the container adapted to form a chamber with said closure member and to control the outflow of any liquid through said opening into said chamber when the pressure removable member is removed, a source of fluid medium under pressure, fluid medium flow control means, the operability of which is controlled by pressure conditions in said chamber, a conduit for conducting the fluid medium from the source of the medium to the flow control means, a second conduit from the flow control means to the container, and means defining a fluid medium conducting path between the first named conduit and said chamber adapted upon predetermined conditions to permit a pressure to be set up in said chamber, whereby said pressure removable member is blown clear of the container under sufficient pressure.

14. In a discharge means for a liquid storage tank, a tank having a liquid escape opening, closure means for said opening adapted to be opened by fluid pressure, means to direct a flow of fluid under pressure against said closure means to open it, and means operable upon opening of said closure adapted to redirect said fluid flow into the tank.

15. In a liquid storage tank having a discharge opening, spaced primary and secondary closure means for the opening of which the primary closure means is pressure rupturable and outermost with respect to the tank, said secondary closure means being adapted to isolate the tank from the space between said primary and secondary closure means and to permit discharge of the liquid from the tank after opening of the primary closure means, a chamber adapted to be placed into communication with said space, frangible means normally separating said space and said chamber, a pair of ports in the wall of said chamber, one of which is adapted to communicate with the tank and the other of which is adapted to communicate with the space adjacent the pressure rupturable means when the frangible means are ruptured, pressure operable means in said chamber adapted to open and close said ports, means to apply a balanced fluid pressure to said pressure operable means, said pressure being adapted to effect rupture of both the frangible means and the pressure rupturable means, and the pressure operable means being adapted upon the unbalance of the pressure following the rupture of both the frangible means and the pressure rupturable means to close the port adapted to communicate with the space adjacent the pressure rupturable means to prevent the escape of the fluid under pressure therethrough and to open the port adapted to communicate with the tank to effect introduction of the fluid under pressure in said tank to thereby expel the liquid therefrom.

HENRY ERNEST HEIGIS.